Oct. 1, 1935.　　　　　E. A. LEACH　　　　　2,016,149
INDICATING DEVICE
Filed July 20, 1933
Fig. 1.
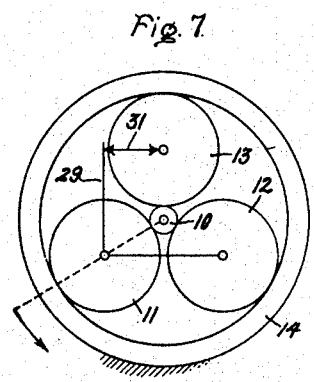
Fig. 7.
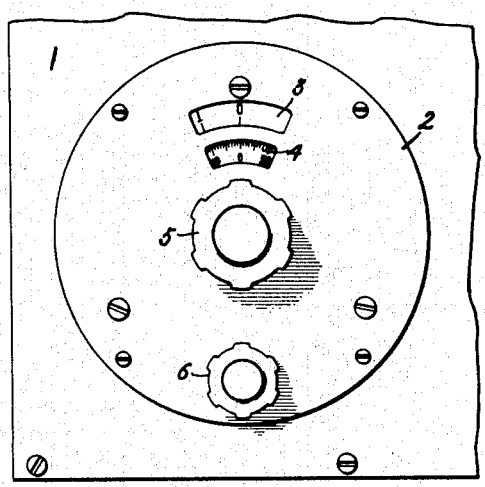
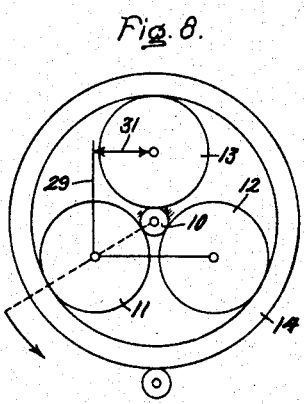
Fig. 8.
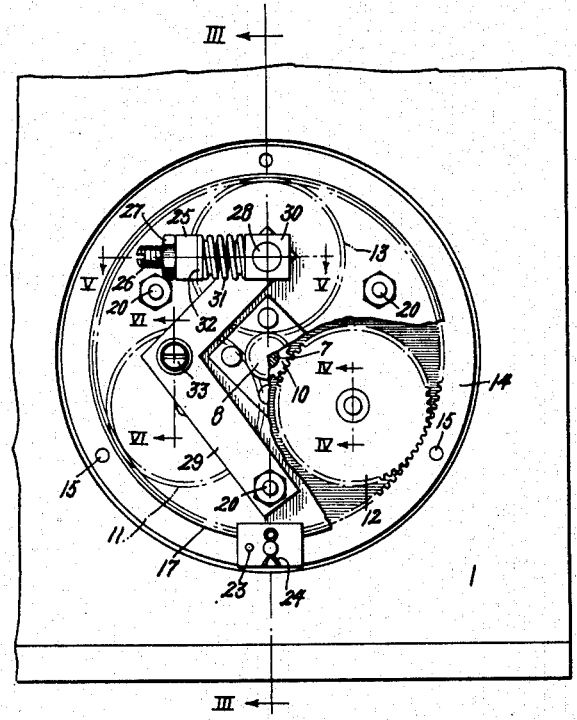
Fig. 2.
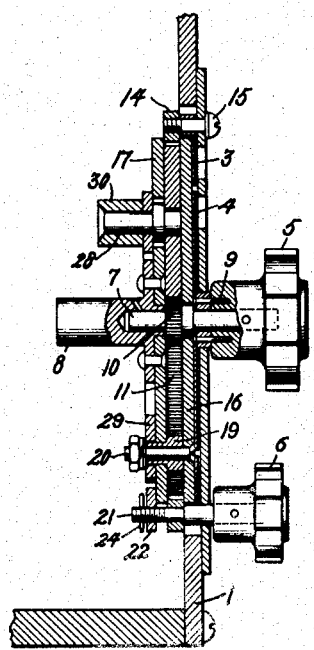
Fig. 3.
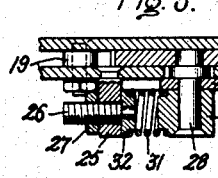
Fig. 5.　Fig. 6.　Fig. 4.
Inventor:
Edward A. Leach,
by Harry E. Dunham
His Attorney.

Patented Oct. 1, 1935

2,016,149

UNITED STATES PATENT OFFICE 2,016,149

INDICATING DEVICE

Edward A. Leach, Schenectady, N. Y., assignor to General Electric Company, a corporation of New York Application July 20, 1933, Serial No. 681,325

5 Claims. (Cl. 74—305)

My invention relates to indicating devices and more particularly to improved means of that type which has a vernier indicating scale.

In providing indicators for adjustable means it frequently has been desirable to provide a vernier indicator moving at a certain ratio with respect to the main indicator. Such arrangements usually involve gear systems which inherently introduce a certain amount of backlash between the indicators. Devices attempting to eliminate the effect of backlash have generally utilized frictional means which increased the torque necessary to make adjustments and, furthermore, after considerable use require adjustments and generally were unsatisfactory.

In radio apparatus, particularly radio transmitters, it is necessary to have an indicator which will provide fine, accurate indications of the adjustment of the tuning device. It is further desirable that the adjusting knob produce a slow adjustment so that small increments of adjustment of the tuning device may be obtained. The friction between the tuning device and the adjusting knob should be relatively small so that these small increments of adjustment may be made easily and readily.

It is an object of my invention to provide a vernier indicator with improved means for preventing backlash without appreciably increasing the friction of the device.

It is a further object of my invention to provide an indicating device, suitable for adjusting radio apparatus, with an epicyclic gear system wherein backlash is eliminated.

The novel features which I believe to be characteristic of my invention are set forth with particularity in the appended claims. My invention itself, however, both as to its organization and method of operation together with further objects and advantages thereof, may be understood best by reference to the following description taken in connection with the accompanying drawing in which Figs. 1, 2, 3 show respectively front, rear and cross-sectional views of a device wherein my invention has been embodied; Figs. 4, 5, 6 show details of the device, and Figs. 7 and 8 indicate diagrammatically certain modifications thereof.

Referring to Fig. 1 of the drawing, I have illustrated therein the panel 1 of a radio apparatus which supports the escutcheon 2 of the device embodying my invention. The escutcheon is provided with two openings through which the indicating scale 3 and the vernier scale 4 are visible. On the front of the escutcheon there are provided the knob 5 for actuating the mechanism and the knob 6 for locking the mechanism after adjustment has been made.

Reference may now be had to Fig. 2 which shows the back view of the device, and to Fig. 3 which is a cross-section viewed in the direction of the arrows III of Fig. 2. The actuating knob 5 is secured to a shaft 7 which extends through the escutcheon 2 to a journal member 8. The vernier scale 4 is fastened to the knob 5 by means of screws 9. The shaft 7 has secured thereto a driving gear 10 which engages the intermediate gears 11, 12 and 13. These intermediate gears in turn engage the ring gear 14 which is secured in a stationary position by the cap screws 15 which extend through the panel 1 from the escutcheon 2. The intermediate gears 11 and 12 are securely journaled in front and rear plates 16 and 17 which are spaced by a spacing member 19 and held in position by means of bolts 20.

The knob 6 is attached to a shaft 21, one extremity of which is threaded. A nut member 22 is mounted on the threaded portion of the shaft 21 and is prevented from rotating by a guide pin 23. The nut member 22 is prevented from coming off on the threaded portion of the shaft by means of a suitable cotter key 24. When the knob 5 shown in Fig. 3 is rotated so as to cause the nut member 22 to move to the right, this member will engage the rear plate 17, thereby holding it in position.

Fig. 4 is a cross-section of the bearing such as used in gears 11 and 12 when viewed in the direction of the arrows IV shown in Fig. 2. The bearing member 18 is journaled in the front and rear plates 16 and 17 and the gear 12 is supported therebetween by the bearing member 18.

Reference may now be had to Fig. 2 and Fig. 5, the latter of which is a cross-section of that portion of the apparatus viewed in the direction of the arrows V of Fig. 2. These figures show how the intermediate gear 13 is supported. A block 25 is riveted to the rear plate 17 and is provided with a threaded opening through which the screw member 26 extends. A lock nut 27 is provided for maintaining the adjustment of the screw member 26. The bearing for the intermediate gear 13 is formed by a member 28 which passes through an opening in the rear plate 17 and is journaled in the arm 29 and the block 30. A spring 31 is arranged between the block 30 and a spring retaining member 32 which is journaled on one extremity of the adjusting screw 26. The arm 29 is secured at one extremity by the bolt 20. The arm 29 is maintained within operating limits by a cap screw 33 which passes through a large opening in the arm. This can be seen best by referring to Fig. 6 which is a cross-section of the bolt viewed in the direction of the arrows VI shown in Fig. 2. The cap screw 33 is threaded into the member 17 and is provided with a spacer 34 so that the washer on the cap screw 33 will not bind against the arm 29.

In the epicyclic gear system shown, and described above, the gear 10 is the driving gear, the ring gear 14 is the fixed gear and the intermediate gears 11 and 12 together with the front and rear plate members 16 and 17 comprise the driven arm. When the gear 10 is rotated by the knob 5, the intermediate gears are actuated so that they rotate about their respective axes, and also progress about the axis of the driving gear 10. The progression of the intermediate gears about the axis of a driving gear 10 provides motion of the plates 16 and 17. The journal member 8 of the shaft 7 is attached to the rear plate 17. This journal member 8 may be coupled to the tuning condenser of a radio apparatus or any other device which is to be adjusted. The actuation of the knob 5 will cause the vernier scale 4 to move with it, and the main scale 3 which is attached to the front plate 16 will move more slowly. Fast actuation of the knob 5 will provide slow motion of the device to be adjusted and a vernier indication of the adjustment will be obtained.

Due to the fact that gears are used in this arrangement, it is evident that the clearance necessary for the proper operation of the gears would introduce a backlash between the two scales were no means provided for eliminating such backlash. The means 13 and 26 to 33 cooperate to provide an arrangement for eliminating backlash. The spring member 31 exerts a force against the driven arm of the system or in other words, the back plate 17. A force is also exerted by the spring against the bearing 28 of the intermediate gear 13. This force between the driven arm of the system and the bearing of the gear 13 tends to cause the gear 13 to progress clockwise and to drive the driven arm counter-clockwise when viewed as in Fig. 2. Due to this tendency of gear 13 to move in a direction opposite to the movement of the gears 11 and 12, the clearance provided for proper meshing of the gear teeth is taken up by the action of the force exerted by the spring member 31. It is to be understood, however, that the spring member 31 produces sufficient tension so that it is always greater than the moment of force introduced into the system by the rotation of the knob 5 to produce adjustment of the device connected to journal member 8. Under this condition then there is no backlash and the friction introduced by the pressure of the gears against the ring gear 14 and the driving gear 10 does not comprise an appreciable amount.

In Fig. 7 the various gears are indicated by circles, the crosshatching on the outer circle or ring gear indicating that this member is fixed. The dotted line indicates that the gears 11 and 12 comprise the driven arm of the system. The arrowed line 31 indicates the force introduced by the spring member 31. Inasmuch as the force introduced by the spring 31 takes up the clearance provided for the proper engagement of the teeth on the gears, it is evident that this arrangement eliminates the backlash between the driving gear and driven member.

Fig. 8 shows an arrangement similar to Fig. 7 in which the backlash has been eliminated between the driving gear and the driven member. In this figure, however, it will be noted that the gear 10 is shown as being a fixed gear. The ring gear in this arrangement may be considered to be the driving gear of the epicyclic gear system. The ring gear may be driven by a suitable gear engaging the periphery of the ring gear. The arrangement disclosed in this figure shows that the specific embodiments set forth in Figs. 1 to 6 are susceptible of modification so that the vernier dial may be fastened to the ring gear 14 and the main dial to the driven arm. Such an arrangement will operate in a manner similar to the preferred embodiment and will provide a system wherein the backlash is eliminated between the main dial and the vernier scale.

While I have shown and described my invention in connection with certain specific embodiments, it will, of course, be understood that I do not wish to be limited thereto, since it is apparent that the principles herein disclosed are susceptible of numerous other applications, and modifications may be made in the mechanical arrangements and in the instrumentalities employed without departing from the spirit and scope of my invention as set forth in the appended claims.

What I claim as new and desire to secure by Letters Patent of the United States, is:

1. In an indicating device, an epicyclic gear system comprising a driving gear, a fixed gear, a plurality of gears intermediate said fixed and driving gear, certain of said intermediate gears constituting the driven arm of said system, and means connected between said arms and the other of said intermediate gears for reducing backlash between said driven arm and said driving gear.

2. In an indicating device, an epicyclic gear system comprising a driving gear, a fixed gear, a plurality of gears intermediate said fixed and driving gear, certain of said intermediate gears constituting the driven arm of said system, and means connected between said arm and the other of said intermediate gears for reducing backlash between said driven arm and said driving gear, said means exerting a pressure between said arm and the axis of said intermediate gear.

3. The combination, in an epicyclic gearing system, of a gear rotatable about its own axis, a plurality of epicyclic gears in engagement therewith, and means to overcome backlash in said system, said means comprising means resiliently to apply a force tending to rotate one of said epicyclic gears with respect to the other about said first mentioned gear, said force being sufficient to eliminate said backlash.

4. In combination, a fixed ring gear, a central gear, a plurality of gears intermediate said ring and central gears, and means to apply a force between said intermediate gears tending to rotate one of said intermediate gears with respect to the other about said central gear, said force being sufficient to overcome backlash between said gears.

5. The combination, of an epicyclic gear system including a driving gear, a fixed gear, a plurality of intermediate gears each engaging said fixed and driving gears, certain of said intermediate gears constituting the driven arm of said system, and means connected between said driven arm and another of said intermediate gears for preventing backlash between said driving gear and said driver arm.

EDWARD A. LEACH.